Feb. 23, 1960 M. CALTHORPE 2,926,042
EXTENSIBLE ROOF MOTOR ROAD VEHICLES
Filed March 28, 1957 6 Sheets-Sheet 1
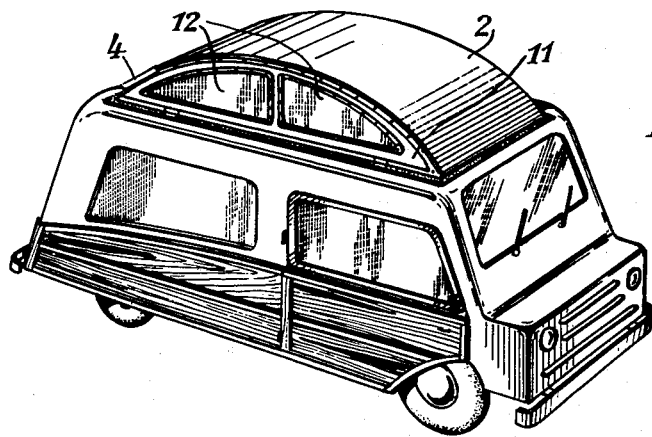
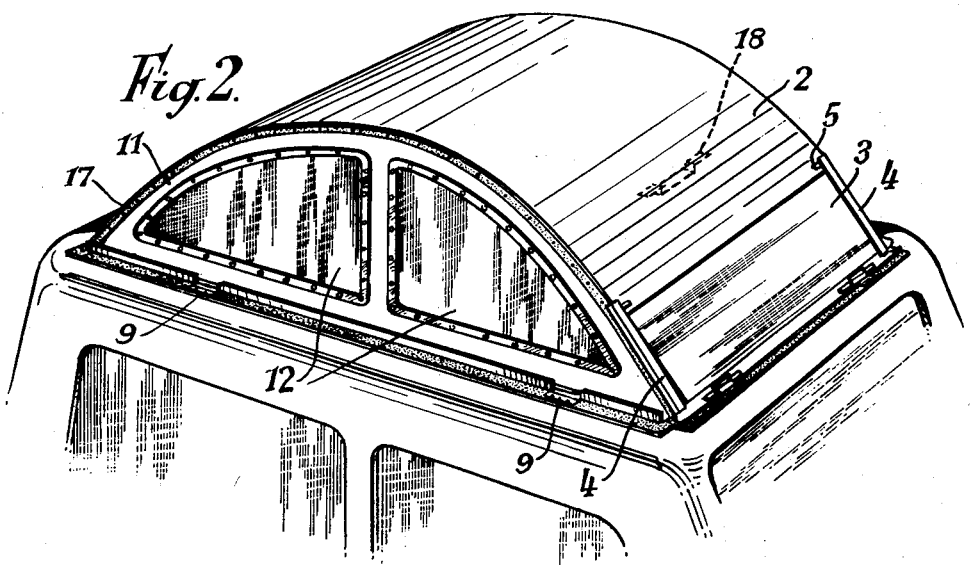
INVENTOR
Maurice Calthorpe
BY
Mason, Nolte and Nolte
ATTORNEY

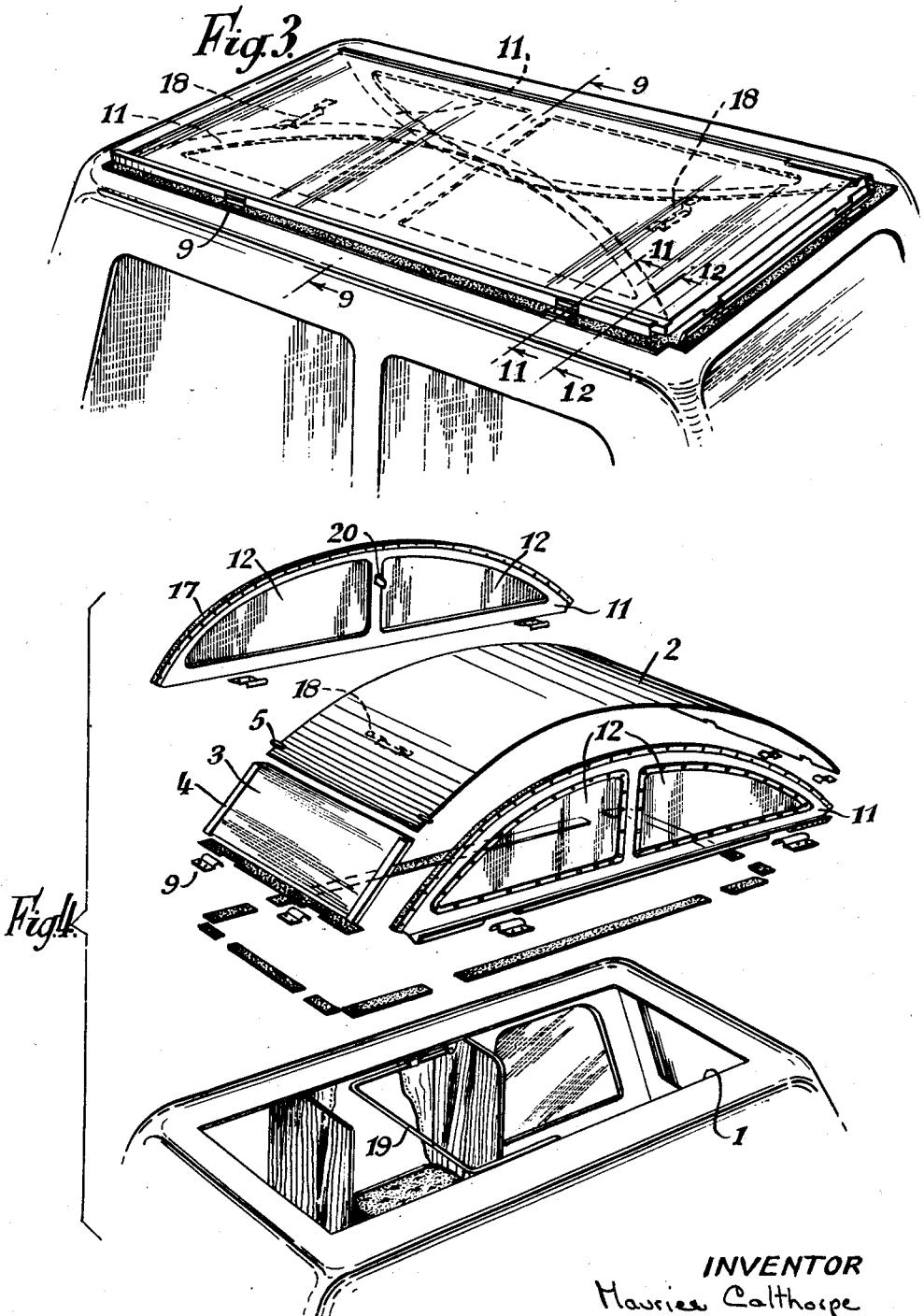

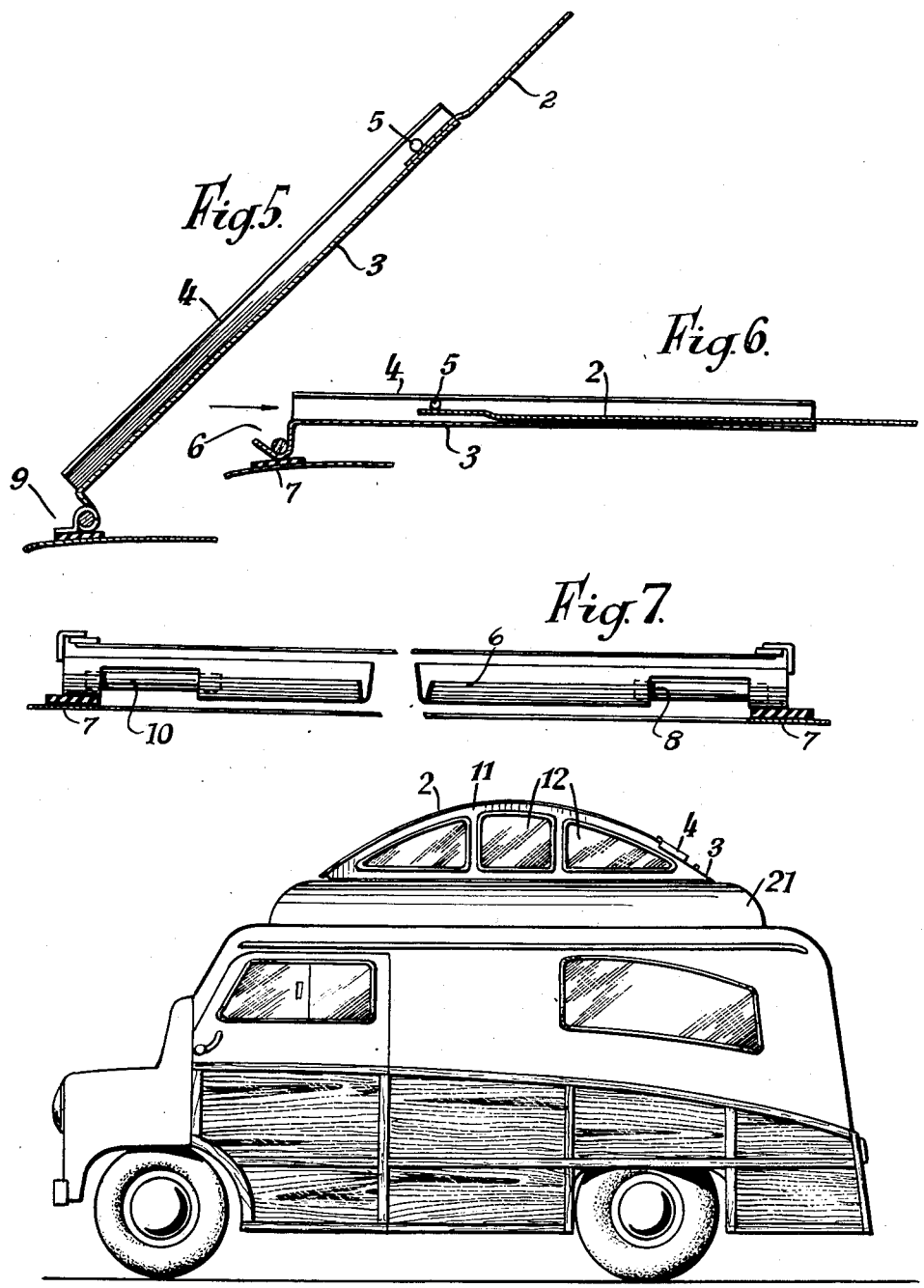

Feb. 23, 1960 M. CALTHORPE 2,926,042
EXTENSIBLE ROOF MOTOR ROAD VEHICLES
Filed March 28, 1957 6 Sheets-Sheet 4

INVENTOR
Maurice Calthorpe
BY
Moses, Nolte and Nolte
ATTORNEY

Feb. 23, 1960 M. CALTHORPE 2,926,042
EXTENSIBLE ROOF MOTOR ROAD VEHICLES
Filed March 28, 1957 6 Sheets-Sheet 5

INVENTOR
Maurice Calthorpe
BY
Masso, Nolte and Nolte
ATTORNEY

United States Patent Office 2,926,042
Patented Feb. 23, 1960

2,926,042

EXTENSIBLE ROOF MOTOR ROAD VEHICLES

Maurice Calthorpe, London, England

Application March 28, 1957, Serial No. 649,217

Claims priority, application Great Britain
August 15, 1956

4 Claims. (Cl. 296—137)

This invention relates to road vehicles and although particularly applicable to passenger carrying road vehicles having bodies of the station wagon type, is nevertheless applicable to goods carrying vehicles and even to trailer caravans.

Although it has been proposed to provide the bodies of passenger carrying road vehicles of the station wagon type with convertible seating arrangements with the object of enabling driver and passenger to obtain a certain amount of sleep during roadside night stops when touring, such bodies, due to their small size and particularly lack of head room have lacked the amenities of even the smaller type of trailer type caravan, and consequently, except for occasional use in an emergency, such conversions have so far not been extensively used by the motoring public.

The chief object of the invention is to evolve a construction of motor road vehicle and particularly a motor vehicle of the station wagon type, which can be converted at will to provide the amenities and spaciousness associated with a trailer caravan of small or medium size.

In the case of goods carrying vehicles which again are often of the station wagon type, the headroom is again limited, and consequently there is often some little difficulty in loading and in the case of vehicles used for the delivery of ladies' dresses and like garments, an increased headroom is desirable so that the dresses can be hung from the roof. Furthermore, in the case of trailer caravans, although the headroom is adequate, the lateral side area is an embarrassment when towing and consequently a caravan which would have a minimum of side area and also a low centre of gravity would, it is thought, have obvious advantages if the effective headroom could be readily increased to normal when in use.

A road vehicle in accordance with the present invention and particularly a vehicle of the station wagon type is so constructed that a part or the whole of the roof is extensible upwardly when required, to provide increased headroom.

Referring to the drawings:

Figure 1 is a perspective view of a vehicle of the station wagon type constructed in accordance with the present invention;

Figure 2 is a perspective view drawn to an enlarged scale, more clearly illustrating the construction and formation of the extensible roof;

Figure 3 is a similar view illustrating the roof in its lowered position, as when the vehicle is traveling along the road;

Figure 8:
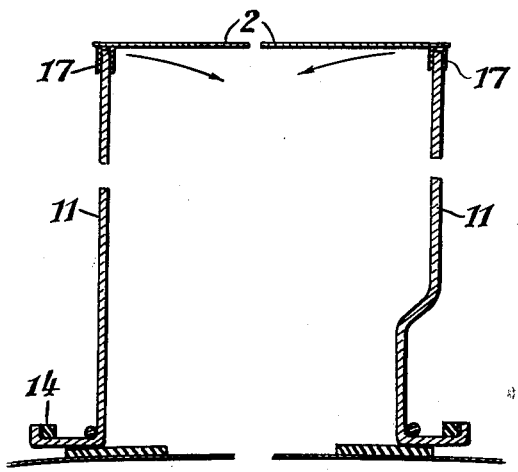
Figure 10:
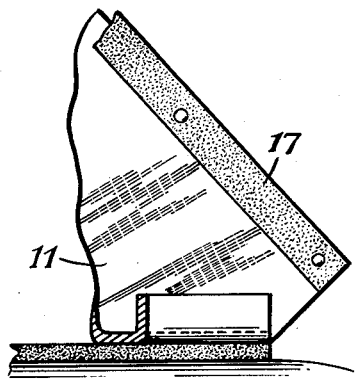
Figure 9:
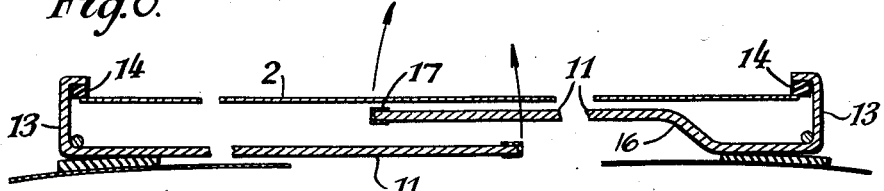
Figure 11:
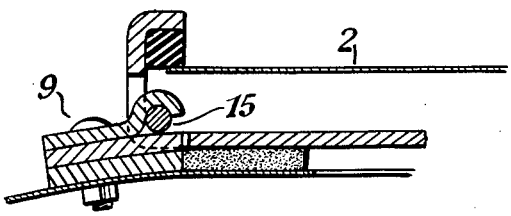
Figure 12:
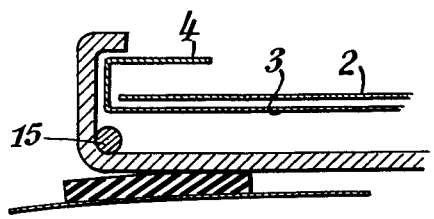
Figure 13:
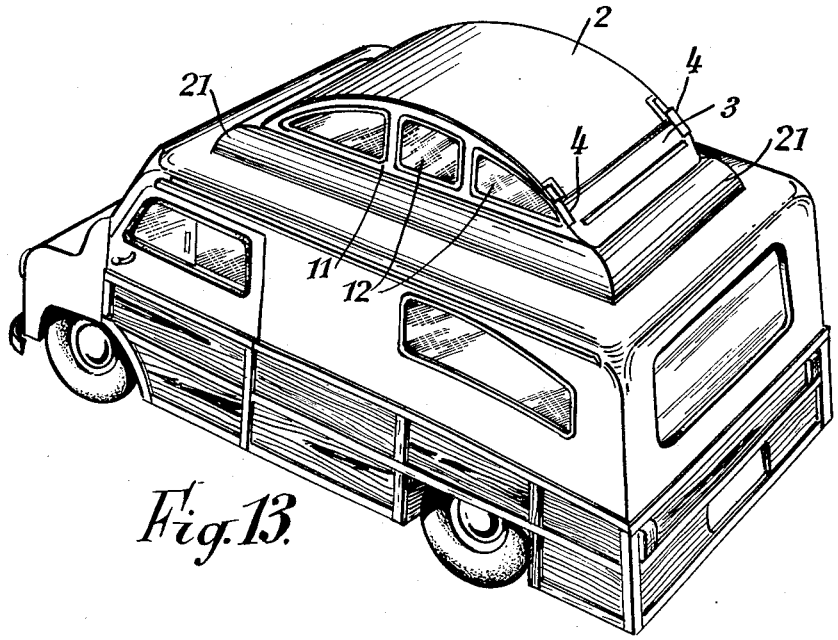
Figure 14:
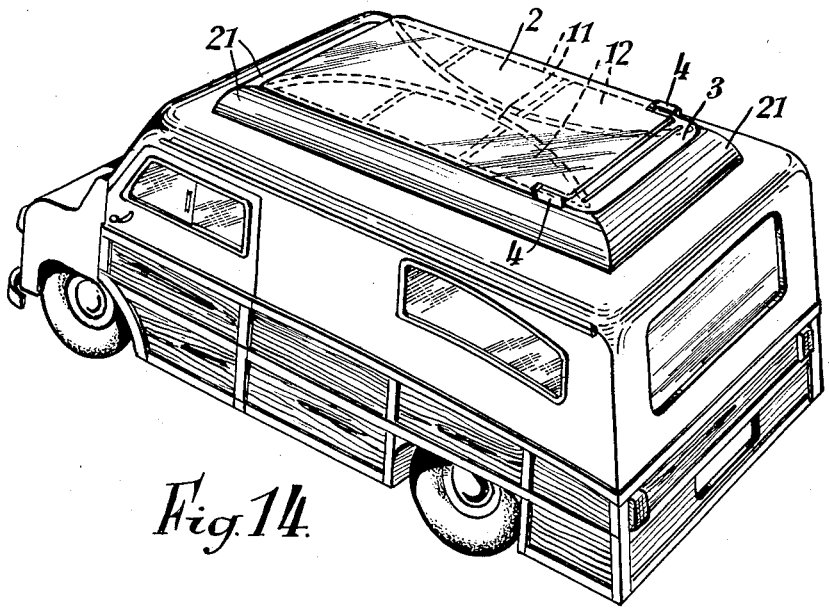
Figure 16:
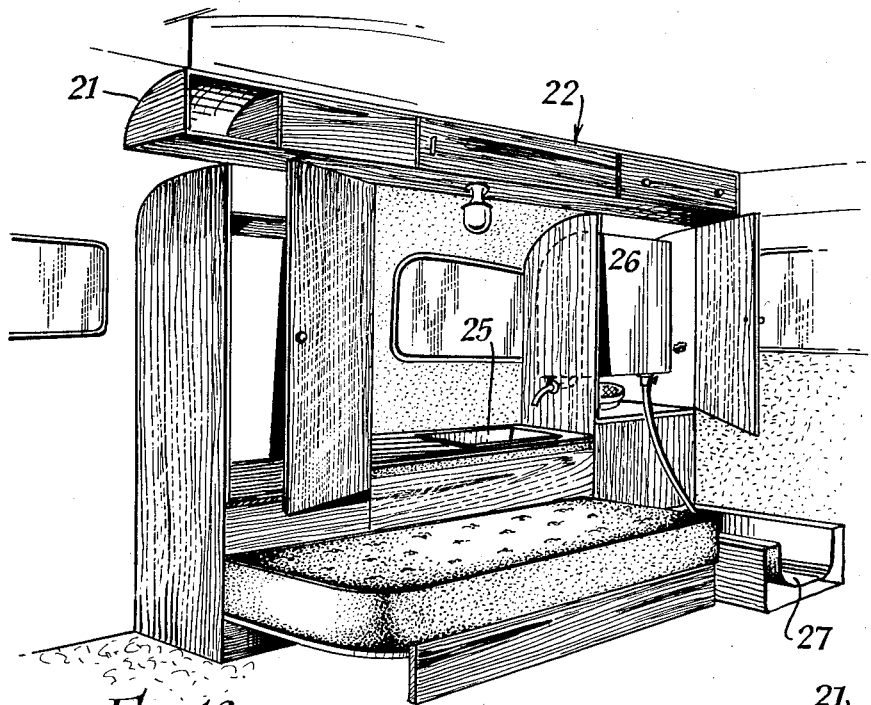
Figure 17:
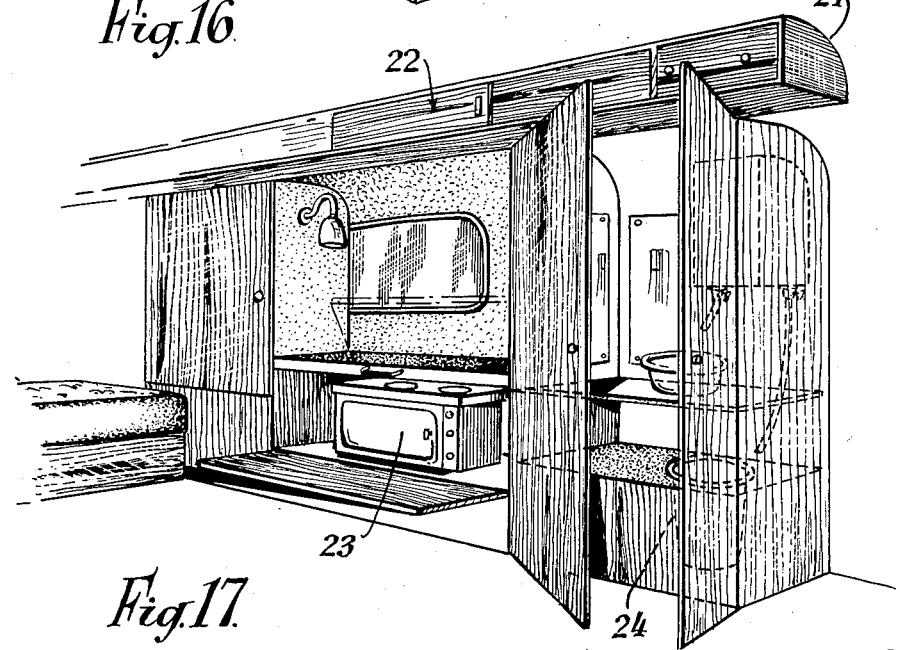

Figure 4 an exploded view illustrating the component parts of the roof;

Figure 5 is a sectional view drawn to an enlarged scale, taken longitudinally of the vehicle and through the front or rear edge of the roof;

Figure 6 is a similar view showing the position which the parts occupy when the roof is lowered;

Figure 7 is a front elevation looking in the direction of the arrow in Figure 6;

Figure 8 is a cross-section through the roof when the latter is extended;

Figure 9 is a similar view showing the roof lowered or collapsed the section being taken on the line 9—9 in Figure 3;

Figure 10 illustrates a constructional detail;

Figures 11 and 12 are respectively fragmentary sections drawn to an enlarged scale on the lines 11—11 and 12—12 in Figure 3;

Figures 13, 14 and 15 are two perspective views of a modified construction and a side elevation of same; and Figures 16 and 17 illustrate the interior fittings in the construction of motor vehicle shown in Figures 13 and 15.

The drawings illustrate a vehicle of the station wagon type and it is proposed in accordance with the invention to provide the upper part of the vehicle with a rectangular opening 1 (see Figure 4) and to assemble within this opening the component parts of a roof which will normally lie flush or substantially flush with the opening 1 but can, when desired, be raised or extended upwardly into the position shown in Figures 1 and 2, to give increased headroom and enable the car or station wagon which contains the sleeping or other amenities of a caravan, to have the spaciousness, particularly as regards headroom, usually associated with a trailer caravan of small or medium size.

With this object in view, the roof includes two parts, namely, a main portion 2 and an end portion 3. The end portion 3 is of a rigid character, whilst the main portion 2 is comparatively flexible or resilient so that it can, when required, be temporarily distorted into an upwardly bowed shape, portion 2 being hinged along its rearward edge to the body.

The lateral edges of the part 3 are turned upwardly and inwardly into channel formation as at 4, and these two channels receive the adjacent end of the part 2 and provide guides in which the part 2 can slide. The part 2 is provided with laterally projecting pins or rollers 5 which slide within the channels and ensure comparatively free sliding movement between the parts.

The part 3 at its lower end is turned downwardly and forwardly as at 6 in the manner clearly illustrated in Figures 6 and 7, and makes good sealing engagement with suitable rubber or like sealing strips 7 secured to the top of the vehicle. This upwardly directed part 6 is cut away as at 8 to receive hinge components 9 and hinge pins 10, the part 3 being thus hingedly connected to the top of the vehicle whilst ensuring a reasonably good moisture proof seal. Alternatively, ordinary type hinges may be employed.

The sides of the extensible roof are closed by segmental-shaped panels 11 which are provided with plastic or other windows 12 and are hinged to the top of the vehicle body adjacent each longitudinal edge of the rectangular opening 1. Each panel 11 is turned upwardly and inwardly along its lower longitudinal edges into channel shaped formation as clearly shown in Figures 8 and 9, this channel shaped part being indicated by reference numeral 13.

Each channel 13 contains a rubber or other sealing strip 14 and it will be seen from Figure 9 that when the roof is in its lowered position, this sealing strip engages the upper edges of the part 2 of the roof so as to exclude moisture and draught.

Figure 11 illustrates in detail the type of hinge which may be employed in connection with the panels. In this case, the hinge components 9 are bolted or otherwise secured to the body of the vehicle and project inwardly through suitably spaced cut away parts of the channel 13 and override longitudinally positioned hinge pins 15.

It will be seen from Figure 9 that the side panels when lowered overlap, and to maintain these two panels in spaced parallel relationship, the frame of one panel is kinked as at 16.

Assuming that the parts occupy the positions shown in Figure 9 and it is desired to raise the roof into its extended position, the two panels are forced upwardly from the interior of the vehicle causing the sealing strips 14 and channels 13 to move clear of the longitudinal edges of the part 2 of the roof. The panels and also the parts 2 and 3 of the roof can then be moved upwardly into the position shown in Figures 1, 2 and 8, and as will be seen clearly from Figure 8, the part 2, and incidentally the end part 3, will then rest on the edges of the two side panels. With the object of providing a good draught and moisture proof seal between the panels and the roof components, the curved upper edge of each panel carries an inverted channel shaped rubber or like sealing strip 17 which engages the under surface of the parts 2 and 3 along their longitudinal edges.

To return the parts to the position shown in Figure 9, the panels are displaced inwardly and the roof components 2 and 3 lowered, the sealing strips 14 and channels 13 then re-assuming their original position in which they hold the roof in its lowered position and provide a good moisture and draught proof seal.

To facilitate this raising and lowering operation, the part 2 of the roof may carry a pair of handles 18 on its under surface, whilst to assist in raising the roof the body may, if necessary, be fitted with a substantially U-shaped lever 19 hinged at its extremities to the body, the position of this lever when the roof is lowered being shown in Figure 4, the lever when raised engaging the under surface of the part 2 and the panels 11, the limbs of the lever 19 preferably engaging clips 20 on the inner surfaces of the two panels, thereby preventing inward hinging movement of the panels towards their lowered position.

It will be appreciated that as part 3 of the roof is incapable of bending or flexing, the side panels will not be of truly segmental or arcuate shape, that is to say, they will include a straight as distinct from a curved portion at one extremity corresponding in length with component 3. Figure 10 illustrates one end of either panel, and it will be seen that this part is straight along its upper edge to receive the roof part 3.

The component parts of the roof may be composed of sheet metal or any other suitable material, provided component 2 is capable of being flexed. It is preferred to construct part 3 comparatively rigid by bending it up into a rigid shape from sheet metal.

The side panels 11 preferably include a metal frame to which is secured some form of transparent or translucent sheet plastic material, such as, for example, the sheet plastic sold under the registered trade mark "Vybak," the plastic being preferably tinted to minimize glare from the sun.

Referring now to Figures 13 to 17 which illustrate a modified and possibly preferred embodiment, in this construction the extensible roof parts are substantially as hereinbefore described, but in this case they are associated with what might be termed a false roof 21 which projects upwardly above the normal roof and does in fact have the advantage that it provides locker space, the various lockers being shown in Figures 16 and 17, and being generally indicated by reference numeral 22.

Figures 16 and 17 provide some indication of the fittings which can be included in a vehicle such as is described, the fittings including a gas cooker 23, toilet 24, sink 25 supplied with water which is heated, from supply tank 26 and a bath 27.

The various mattresses, cushions, etc. can be rearranged to provide sleeping accommodation for at least four persons or seating accommodation for at least twice that number, ample cupboard and wardrobe space being available for containing all the necessities for living and sleeping in the vehicle when so desired.

The space in the roof which is produced as a result of the side panels being raised, may serve to provide additional sleeping space. For example, a child's bed may be slung hammock-wise from the roof beneath the central upwardly extensible part and lengthwise of the vehicle.

With either arrangement hereinbefore described, it is possible to provide an estate car or station wagon type vehicle of pleasing appearance, and of normal height with consequent low centre of gravity, the roof of which vehicle can be extended upwardly when required so that the available headroom will be comparable with the headroom normally available in the usual trailer type caravan.

The vehicle, may with advantage, be extensible rearwardly to give increased living space, in which case the vehicle may be closed at the rear by a flap-like door hinged along its upper edge. The sides of the door and the lower edge may be connected with the sides and floor of the vehicle by suitable panels which, together with the rear door when the latter is raised into a substantially horizontal position, form a rearward extension of the vehicle.

As previously explained, such an extensible roof can be of considerable use in a goods carrying vehicle or a vehicle which can be used for carrying goods, or passengers, the increased headroom facilitating loading and providing increased goods space. Furthermore, in the case of a trailer type caravan, a caravan can be designed so that it will be of comparatively low height, the head room being increased when required by raising the upwardly extensible roof.

I claim:

1. A motor vehicle normally having a comparatively low top and a comparatively low center of gravity, said top having fixed edges and a roof capable of being bowed upwardly when desired to increase the effective head room inside said vehicle, said roof comprising a plurality of sections joined together, one of said sections being fixedly secured at its outer edge to a first edge of said top, a second of said sections being fixedly secured at its outer edge to an edge of said top opposite said first edge, the sections of said roof being movably secured to each other intermediate the ends of said roof and adapted to slide over each other by the upward and downward movement of said roof, side panels hingedly secured at opposite sides of said top at the remaining edges of said top and disposed beneath said roof, said panels being hinged to fold inwardly of said vehicle into a horizontal position and adapted to engage the under surface of said roof to bow it upwardly by its movement from said horizontal to a vertical position, said panels having free edges so formed as to form an enclosure with the roof when in raised position.

2. A motor vehicle according to claim 1 wherein said plurality of roof sections comprising a front and back section, said front and back sections being fixedly secured at their outer edges at opposite edges of said top and slideably secured to each other at their inner edges and adapted to slide over each other by the upward and downward movement of said roof.

3. A motor vehicle according to claim 2 wherein said panels comprise a pair of panels, each panel being disposed at opposite sides of said top, said panels lying in overlapped relationship to each other when they are in their horizontal position.

4. A motor vehicle according to claim 3 wherein the edges of said panels adjacent their hinged connection are bent to form a channel adapted to override the roof when the latter is in its low position.

(References on following page)

References Cited in the file of this patent

UNITED STATES PATENTS

| | | |
|---|---|---|
| 1,269,431 | Guthrie | June 11, 1918 |
| 1,734,803 | Gable | Nov. 5, 1929 |
| 1,935,993 | Reutter | Nov. 21, 1933 |
| 1,972,415 | Anderson | Sept. 4, 1934 |
| 2,483,332 | Brumbaugh | Sept. 27, 1949 |
| 2,783,079 | Kurka | Feb. 26, 1957 |
| 2,805,884 | Kinsman | Sept. 10, 1957 |

FOREIGN PATENTS

| | | |
|---|---|---|
| 100,293 | Australia | Feb. 12, 1937 |
| 1,052,397 | France | Sept. 23, 1957 |
| 800,276 | Germany | Oct. 25, 1950 |